United States Patent [19]

Vogel

[11] Patent Number: 5,864,298

[45] Date of Patent: *Jan. 26, 1999

[54] PAGER (RINGER) AMPLIFICATION BY CO-OPERATIVE EMISSION RELAY (PACER/RACER)

[75] Inventor: Wolfhard J. Vogel, Austin, Tex.

[73] Assignee: Board of Regents, The University of Texas System, Austin, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 733,507

[22] Filed: Oct. 18, 1996

Related U.S. Application Data

[60] Provisional application No. 60/005,755 Oct. 20, 1995.

[51] Int. Cl.$^6$ .................................................. H04Q 7/00
[52] U.S. Cl. .......................... 340/825.44; 340/825.47; 340/825.49; 340/825.54; 340/825.52; 455/11.1; 455/13.1; 455/38.2; 455/567; 455/417; 455/426; 455/458; 379/211
[58] Field of Search ...................... 340/825.52, 825.44, 340/825.47, 825.54, 825.49; 370/280, 321; 455/38.5, 38.1, 11.1, 567, 38.2, 13.1, 426, 427, 458, 417, 31.3; 379/211

[56] References Cited

U.S. PATENT DOCUMENTS

| | | | |
|---|---|---|---|
| 3,513,397 | 5/1970 | Shimada | 325/6 |
| 3,723,876 | 3/1973 | Seaborn, Jr. | 325/64 |
| 3,772,596 | 11/1973 | Edwards | 325/13 |
| 4,696,054 | 9/1987 | Tsugei et al. | 455/89 |
| 4,804,954 | 2/1989 | Macnak et al. | 340/825.44 |
| 4,814,763 | 3/1989 | Nelson et al. | 340/825.44 |
| 4,875,038 | 10/1989 | Siwiak et al. | 340/825.44 |
| 4,918,437 | 4/1990 | Jasinski et al. | 340/825.44 |
| 5,237,321 | 8/1993 | Oliwa | 340/825.44 |
| 5,353,331 | 10/1994 | Emery et al. | 379/58 |

OTHER PUBLICATIONS

International Search Report for PCT/US96/16627, Mar. 18, 1997.

Leiner et al., "Scanning the Issue", *Proceedings of the IEEE*, 75:1, 3–4, Jan. 1997.

Fifer and Bruno, "The Low–Cost Packet Radio," *Proceedings of the IEEE*, 75:1.33–42, Jan. 1987.

*Primary Examiner*—Michael Horabik
*Assistant Examiner*—Yves Dalencourt
*Attorney, Agent, or Firm*—Arnold, White & Durkee

[57] ABSTRACT

A pager/ringer system for permitting co-operative emission relay between a plurality of user terminals of a satellite personal communication network (S-PCN) service. Each user terminal includes a receiver, a transmitter, a memory storage device and a unique address. By permitting relay between user terminals, the S-PCN will achieve improved dependability in signal-blocking environments by exploiting the spatial diversity of satellite signal strength.

22 Claims, 1 Drawing Sheet

PAGER (RINGER) AMPLIFICATION BY CO-OPERATIVE EMISSION RELAY (PACER/RACER)

This application claims priority to U.S. Provisional Application, Ser. No. 60/005,755, by Wolfhard J. Vogel, dated Oct. 20, 1995.

BACKGROUND OF THE INVENTION

The present invention relates to improving the success of satellite personal communications network (S-PCN) services, such as paging and call-notification, especially in dense urban areas. More specifically, the present invention relates to a method and apparatus for permitting user terminals (UT's) to transmit and respond to requests for co-operative forwarding of pages or rings. These UT's may be, for example, a pager or telephone.

S-PCN services utilize geostationary or non-geostationary orbit satellites to transmit messages. The transmitted messages are received by UT's which generally decode the message and alert the user to the receipt of the message. A transmitted message is usually a brief sequence of data which generally includes the unique address of the intended UT followed by alpha-numeric information. When the UT is a pager, this information may be, for example, a number to call, an agreed code, or a short sentence. When the UT is a telephone, this information may be, for example, an instruction to activate the UT's ringer. Current satellite power limitations, however, prevent the transmission of signals of sufficient strength to ensure penetration into ferro-concrete-glass buildings. These buildings, however, house a very important customer group for S-PCN services. Further, this customer group must be served with high dependability to ensure the success of the S-PCN service.

Therefore, a system must be developed to permit high dependability messaging into such an environment. One alternative would be to place high-power paging and ringing repeaters into selected high-density cities. However, in addition to its own technical drawbacks, this alternative would produce a negative image for a global satellite system. Although traditionally pagers are one-way devices, another alternative would present a two-way UT for messaging. However, this alternative is impractical because of battery-power limitations, as messages would be required to reach back to the satellite. It would therefore be desirable to utilize some form of two-way paging, without the need to send messages back to the satellite.

SUMMARY OF THE INVENTION

The present invention is directed to solving the above described problems. More particularly, the apparatus and methods of the present invention present a user terminal (UT) which provides for the capability both to transmit and respond to requests for co-operative forwarding of pages or rings. Thus, the present invention enables a blocked UT to receive pages or rings relayed to it by another UT within its vicinity which is receiving messages. A UT becomes blocked when the attenuation of the satellite signal exceeds the fade margin allowed by the system, thereby making reception of useful information from the satellite impossible. When a UT becomes blocked, it will transmit a request for paging relay (RPR), which includes the blocked UT's unique address. Any clear UT in the blocked UT's general area will receive and store this address in its memory stack. When a message for the blocked UT is received by a clear UT, it will re-transmit the message to the blocked UT, which will process it as if received directly from the satellite.

The present invention includes a co-operative emission relay system, comprising a first user terminal having a first unique address. The first user terminal may be adapted to transmit a request for relay, which may include the first unique address. The present invention also includes a second user terminal adapted to receive and store the request for relay, and further adapted to receive a transmission signal having a receiving address, and further adapted to compare the receiving address to the first unique address. The second user terminal may be further adapted to transmit the transmission signal if the receiving address equals the first unique address.

The present invention also includes an apparatus for co-operative emission relay of transmission signals, comprising a receiver to receive a plurality of transmission signals, each having an address and a message, a converter to convert each of the transmission signals to digital logic signals encoding the address and message, a comparator to determine whether the message is a request for relay from a blocked user terminal and a storage unit to store the address of the blocked user terminal. The comparator is further adapted to compare another address to the address of the blocked user terminal to determine whether the two addresses are equal, thereby indicating that the transmission signal is intended for the blocked user terminal. The apparatus may also include a transmitter to relay transmission signals when the transmission signal is intended for a blocked user terminal.

The present invention also includes a method of co-operative emission relay communication, comprising the steps of transmitting a request for relay from a blocked user terminal, which includes a unique address of the blocked user terminal; receiving the request for relay within a second user terminal; storing the unique address of the blocked user terminal within the second user terminal; receiving a transmission signal within the second user terminal; determining whether the transmission signal is intended for the blocked user terminal; and relaying the transmission signal if it is intended for the blocked user terminal.

DETAILED DESCRIPTION

Figure 1:
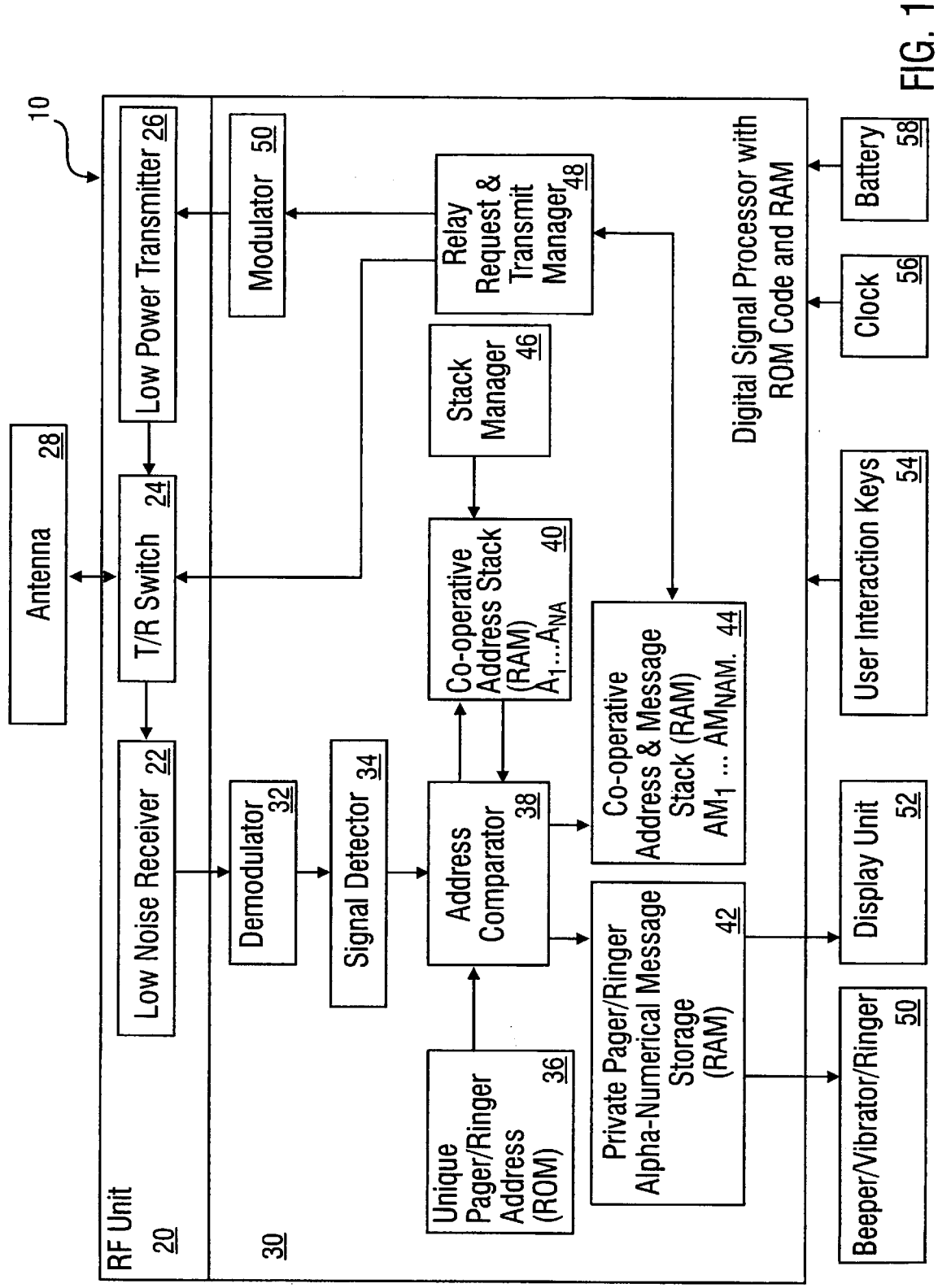
FIG. 1 is a block diagram schematic of a PACER/RACER user terminal according to the present invention.

An exemplary embodiment of the present invention includes a user terminal (UT) with the capability both to transmit and respond to requests for co-operative forwarding of pages or rings. When a UT fails to detect any satellite paging or ringing activity for approximately 4 seconds, as counted by the UT's internal clock, it will issue, with very low power, a request for assistance. A UT may fail to detect activity, for example, because it is in a signal-blocking environment. This request will include the blocked UT's unique address and other information, such as whether the request is for paging, ringing, or both. Any other UT within the general vicinity of the blocked UT, generally on the order of 300 meters, which receives the request will store the blocked UT's address in a memory stack.

This receiving UT, in addition to its normal functions, such as responding to its own messages and rings, will respond to pages or rings directed to any UT address in its memory stack. The receiving UT responds by re-transmitting such messages, also with low power, to the blocked UT. Thus, the blocked UT will receive a relayed message which may be decoded by the UT as if it had been issued directly from the satellite.

A PACER/RACER UT according to the present invention is shown schematically in FIG. 1. The UT unit 10 includes an RF unit 20 with associated antenna 28, digital signal processor 30, beeper/vibrator/ringer50, display unit 52, user interaction keys 54, internal UT clock 56, and battery 58. The RF unit 20 contains components used to receive satellite transmissions and transmit with low power satellite-like transmissions. The digital signal processor 30 contains components used to determine whether a message is intended for the present UT, or should be relayed to another UT.

In the exemplary embodiment shown in FIG. 1, RF unit 20 includes a low noise receiver 22, a transmit/receive switch 24, and a low power transmitter 26. In operation, the UT receives signals from the satellite or another UT through antenna 28. The antenna 28 couples the electromagnetic waves received to the transmit/receive switch 24. During the receive mode, the switch 24 connects the electromagnetic waves to the low noise receiver 22 and disconnects the transmitter 26 output. The low noise receiver 22 filters and amplifies weak received signals in the desired frequency band and converts them to baseband without adding significant thermal noise power.

After passing through the receiver 22, received signals enter the digital signal processor unit 30. The received signals are first converted from modulated baseband signals to logic levels in the demodulator 32. The logic signals then pass to the signal detector 34 which decodes and forwards the decoded address and any message content to the address comparator 38. If the signal detector 34 notes the absence of any useable satellite signal for a continuous period of approximately 4 seconds, it will notify the relay request & transmit manager 48 to issue a request for paging or ringer relay (RPR). As long as the blocked condition continues, even intermittently, the request will be repeated approximately every 4 minutes.

Address comparator 38 compares the received message's address to the unique pager/ringer address, which is stored in ROM 36. If there is a match, comparator 38 sends the related received message to the private pager/ringer message RAM 42. In addition to the message, the time of arrival of the message is also stored in RAM 42. If a new message comes in, it can cause the beeper\vibrator\ringer 50 to be activated to alert the UT user to the presence of a new message.

If the received message is not for the receiving UT, address comparator 38 will check to determine whether the message is an RPR from another UT. If the message is a request, the address comparator 38 will send the requesting UT's address and type of request (ringer, pager amplification, or both) to the co-operative address RAM 40. The RAM 40 stores the address of the requesting UT and the time at which the request was received most recently. The RAM 40 may be one read/write structured memory location, but a larger memory of 16 or 256 locations may be utilized. Oversizing RAM 40 will have minimal impact on system efficiency. Stack manager 46 is a device or algorithm that deletes old addresses from the co-operative address RAM 40. After approximately 4–5 minutes with no additional request from a blocked UT, the stack manager 46 will delete the blocked UT's address from co-operative address RAM 40.

If the received message is not for the receiving UT nor an RPR, the address comparator 38 will compare the received address to the addresses stored in co-operative address RAM 40. If there is a match, the address, message and time of arrival are stored in the co-operative address and message RAM 44. The size of RAM 44 may be one location, if the message is re-transmitted immediately during the next message slot and no repeated re-transmissions are made. If, however, re-transmission is delayed or repeated, then the RAM 44 may be larger, on the order of 16 or 256 locations. Oversizing the RAM 44 will have minimal impact on system efficiency. If the received message is not an RPR or a match, then the address and message are discarded.

Messages to be relayed to other UT's are sent from co-operative address & message RAM 44 to the relay request & transmit manager 48. The manager 48 is a device or algorithm that repackages the relayed message in the same signal format used by the S-PCN. The manager 48 transmits the relayed message to the modulator 50 at the proper time. Alternately, when ordered by the signal detector 34, manager 48 will send a request for co-operative emission, also at the proper time. The proper time is derived from the satellite transmissions if available, or the internal clock 56. The clock 56 may be, for example, a stable crystal oscillator. The timing of all actions is derived from clock 56 when the UT is not receiving satellite transmissions.

The output of the relay request and transmit manager 48 enters modulator 50. Modulator 50 converts the logic signals to a modulated baseband signal. This signal is output to the low power transmitter 26 which converts the baseband signal to the operating frequency of the S-PCN. The transmitter 26 also filters out any undesirable frequencies and provides sufficient amplification so that approximately 90% of any UT's within a range of approximately 300 meters can receive and decode the signal. The transmitter type depends on the frequency and modulation employed by the S-PCN, as a satellite-like transmission is desired.

The amplified signal from transmitter 26 passes through the switch 24, which is controlled by manager 48 to connect the transmitter output to the antenna and disconnect the input to the low noise receiver 22 while in the transmit mode. The antenna 28 then converts the signal into propagating electromagnetic waves to be received by another UT.

Other features of the PACER/RACER UT shown in FIG. 1 include the display unit 52, which is an alpha-numerical display for user interaction with the UT. Also, user interaction keys 54 provide for one or more switches or keys for user interaction with the UT. Battery 58 stores and supplies the electrical power needed to operate the UT.

One method of implementing the co-operative emission relay is for an S-PCN user entering into a signal-blocking environment, such as a ferro-concrete-glass building, to bring a second UT to be utilized as a relay station. This second UT is placed at a location more likely to receive the satellite signals, for example, outside of the building or at a different location within the building. However, as the S-PCN system attracts more subscribers, such a method should become unnecessary, especially in high-density urban areas. Other methods of implementing the relay system depend on the environment. For example, an office building, hotel, or airport operator may deploy roof-top PACER/RACER UT's as local repeaters. Alternately, satellite system operators may "seed" strategic locations with PACER/RACER UT's.

The drain on the UT battery does not present a major problem, as the transmitting UT need only re-transmit selected messages over a short range with minimal impact on battery life. The power required for the close-range bursty communication is approximately several milliwatts, permitting low-cost implementation. Further, this drain does not present a problem for satellite telephones, which already have a transmitter present, as well as a large capacity battery.

Since the PACER/RACER system is transparent to the satellite, it has minimal impact on satellite design. However, for optimal application of the relay scheme some impact on the paging and ringing signaling protocols can be expected. The problems of building penetration of the relay signals can be analyzed with the tools already developed for terrestrial paging. These tools include measurement campaigns or simulations based on measurements published in engineering journals or books. The timing protocols of the relay signals can also be analyzed with already existing terrestrial design tools. The pager/ringer relay emissions may use, for example, a slotted ALOHA protocol, or any other common random messaging scheme. Preferably, the timing protocol should match the protocol used by the S-PCN. Depending on the protocol implemented, the short range nature of the relay allows coherent addition of multiple relay emissions, thus further increasing the chance of reception.

In an exemplary embodiment, the request for paging relay (RPR) may include an indication of the generation level of the request, to enable more sophisticated relay managing. For example, a blocked UT's RPR can be repeated by another blocked UT's RPR, and so on, until it reaches a clear UT. Earlier blocked UT's addresses are sent as part of the later blocked UT's RPR. Including a relay depth in the memory stacks and requests would allow limiting the number of relay hops by a relay depth manager, which is not shown in FIG. 1. Further, a clear UT may send an acknowledgment message to a blocked UT, indicating its receipt of the RPR. This acknowledgment message may include the address and an acknowledgment code and provide a timing signal. This timing signal is used by a blocked UT for time synchronization so that it can accurately predict when to re-transmit a message.

To enable optimal system performance, UT addresses in the memory stack of a clear UT should have a limited lifetime (latency). In an exemplary embodiment, this latency period may be on the order of approximately 4–5 minutes. This latency will prevent a clear UT's memory stack from becoming filled. Because of this latency, blocked UT's must re-issue its RPR within a time interval less than that lifetime to allow for continued co-operative emissions.

Further modification and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A co-operative emission relay system, comprising:
    a first user terminal having a first unique address, said first user terminal transmitting a request for relay, said request for relay including said first unique address; and
    a second user terminal for receiving and storing said request for relay, for receiving a transmission signal having a receiving address, for comparing said receiving address to said first unique address, and for transmitting said transmission signal if said receiving address equals said first unique address.

2. The co-operative emission relay system of claim 1, further comprising a ROM within said first user terminal for storing said first unique address.

3. The co-operative emission relay system of claim 1, wherein said request for relay comprises a request for paging.

4. The co-operative emission relay system of claim 1, wherein said request for relay comprises a request for ringing.

5. The co-operative emission relay system of claim 1, further comprising a ROM within said second user terminal for storing a second unique address.

6. The co-operative emission relay system of claim 1, further comprising a RAM within said second user terminal for storing said first unique address.

7. The co-operative emission relay system of claim 1, further comprising an address comparator for comparing said first unique address to said receiving address.

8. The co-operative emission relay system of claim 1, said second user terminal further comprising a radio frequency unit and a digital signal processor.

9. The co-operative emission relay system of claim 1, wherein said transmission signal is sent by a satellite.

10. An apparatus for co-operative emission relay of transmission signals, comprising:
    a receiver for receiving a plurality of said transmission signals, each of said transmission signals having an address and a message;
    a converter for converting each of said transmission signals to digital logic signals encoding said address and said message;
    a comparator for determining whether said message is a request for relay from a blocked user terminal;
    a storage unit for storing said address of said blocked user terminal;
    said comparator further comparing a predetermined address to said address of said blocked user terminal to determine whether said transmission signal is intended for said blocked user terminal; and
    a transmitter for relaying said transmission signals when said transmission signal is intended for said blocked user terminal.

11. The apparatus of claim 10, wherein said transmitter comprises a low power transmitter.

12. The apparatus of claim 10, wherein said converter comprises a demodulator and a signal detector.

13. The apparatus of claim 10, wherein said storage unit comprises a RAM.

14. The apparatus of claim 10, wherein one of said transmission signals comprises said request for relay.

15. The apparatus of claim 10, wherein one of said transmission signals comprises a page or ring intended for said blocked user terminal.

16. The apparatus of claim 10, further comprising a relay request generator.

17. The apparatus of claim 10, wherein said storage unit further stores said message intended for said blocked user terminal.

18. A method of co-operative emission relay communication, comprising the steps of:
    transmitting a request for relay from a blocked user terminal, said request for relay including a unique address of said blocked user terminal;
    receiving said request for relay within a second user terminal;

storing said unique address of said blocked user terminal within said second user terminal;

receiving a transmission signal within said second user terminal;

determining whether said transmission signal is intended for said blocked user terminal; and relaying said transmission signal if said transmission signal is intended for said blocked user terminal.

19. The method of claim 18, wherein said determining step comprises comparing an address of said transmission signal with said unique address for equality.

20. The method of claim 18, further comprising deleting said stored unique address after a predetermined time if no additional request for relay from said blocked user terminal is received within said second user terminal.

21. The method of claim 18, wherein said storing step further comprises storing a message and a time of arrival of said transmission signal within said second user terminal.

22. The method of claim 18, wherein said apparatus is located adjacent and external to a signal blocking environment housing a plurality of user terminals.

* * * * *